United States Patent [19]

Kosch

[11] Patent Number: 4,465,246

[45] Date of Patent: Aug. 14, 1984

[54] WELDING WIRE DISPENSER

[76] Inventor: Delmar D. Kosch, 1730 Woodland Dr., Columbus, Nebr. 68601

[21] Appl. No.: 574,867

[22] Filed: Jan. 30, 1984

Related U.S. Application Data

[63] Continuation-in-part of Ser. No. 533,217, Sep. 19, 1983.

[51] Int. Cl.$^3$ ............................................. B65H 59/04
[52] U.S. Cl. ................................ 242/156.2; 242/54 R; 242/99; 242/129.8
[58] Field of Search ................... 242/156.2, 156, 129.8, 242/99, 54 R, 75.4, 75.43

[56] References Cited

U.S. PATENT DOCUMENTS

| | | | |
|---|---|---|---|
| 438,782 | 10/1890 | Stowbridge | 242/156.2 X |
| 653,717 | 7/1900 | Wardwell, Jr. | 242/156.2 |
| 1,418,706 | 6/1922 | Hampton | 242/156.2 |
| 2,127,936 | 8/1938 | Pierce | 242/156.2 X |
| 2,528,410 | 10/1950 | Banaszak | 242/156.2 |
| 3,004,732 | 10/1961 | Fischer | 242/129.8 |
| 3,101,912 | 8/1963 | Bartlett | 242/156.2 |
| 3,323,752 | 6/1967 | Kurtz | 242/199.8 |
| 3,436,031 | 4/1969 | Winders | 242/156.2 |
| 4,003,290 | 1/1977 | Haehnel et al. | 87/57 |
| 4,241,884 | 12/1980 | Lynch | 242/54 R |

*Primary Examiner*—Stanley N. Gilreath
*Attorney, Agent, or Firm*—Zarley, McKee, Thomte, Voorhees & Sease

[57] ABSTRACT

A welding wire dispenser for dispensing wire to a wire feeder comprising a support having a hub mounted thereon and extending upwardly therefrom. The hub has a horizontally disposed annular brake pad at its upper end. A vertically disposed and vertically movable shaft is rotatably mounted in the support and extends upwardly through the hub. A coil support is rotatably mounted on the upper end of the shaft and is vertically movable therewith. The coil support has a horizontally disposed annular portion at its lower end which is adapted to frictionally engage the annular brake pad to limit the rotation of the coil support at times. An arm is secured to the upper end of the shaft and extends upwardly and outwardly therefrom. A pulley is supported on the outer end of the arm and has the wire extending from the wire coil received thereon. A cam follower is mounted on the shaft within the hub and rolls upon a helical cam surface. As the wire feeder pulls wire from the coil, the arm pivots toward the wire feeder which causes the shaft to rotate and to raise the coil support upwardly so that the coil support will freely rotate. A spring is in engagement with the shaft for rotatably urging the shaft in a direction so that the cam follower will move downwardly on the helical cam surface.

1 Claim, 5 Drawing Figures

WELDING WIRE DISPENSER

BACKGROUND OF THE INVENTION

This is a continuation-in-part application of application Ser. No. 533,217 filed Sept. 19, 1983.

In many types of welding operations, a wire feeder feeds wire to a welder. The welding wire is normally wound upon coils or reels and is unwound therefrom as wire is being consumed. Some types of wire dispensers have been provided which can dispense wire from wooden reels while other types of wire dispensers have been provided which can dispense wire from paper reels. However, to best of applicant's knowledge, a wire dispenser has not been provided which can accommodate both paper and wooden spools.

One type of wire dispenser is disclosed in U.S. Pat. No. 4,235,624 wherein wire is pulled from a stationary coil. However, a twist or torque is created in the wire and such a twist or torque frequently interferes with the welding operation. Many other types of wire dispensers have also been provided but they are either extremely cumbersome, expensive or difficult to use.

The welding wire dispenser disclosed in applicant's copending application represented a significant advance in the art. In applicant's earlier device, the weight of the wire reel causes the reel support to lower into braking engagement. However, it has been found that it is sometimes necessary to move the braking surfaces into contact with one another by means of a spring when the wire on the reel is substantially depleted thereby resulting in less weight.

SUMMARY OF THE INVENTION

A welding wire dispenser is disclosed which dispenses wire to a wire feeder. A floor-engaging support means is provided and has a hollow hub extending upwardly therefrom. An annular brake pad is secured to the upper end of the hub. A vertically disposed shaft rotatably extends upwardly through the hub and is vertically movable by means of a cam follower mounted on the shaft which is in engagement with a helical cam positioned within the hub. A coil support is rotatably mounted on the shaft above the hub and is vertically movable with the shaft. The coil support is adapted to support a coil or reel of welding wire thereon. An arm is removably secured to the upper end of the shaft and extends upwardly and outwardly therefrom so that a pulley at the outer end thereof is disposed laterally of the wire coil. The wire from the coil extends around the pulley and the movement of the wire towards the wire feeder causes the arm to move towards the wire feeder which causes the shaft to rotate and to vertically move upwardly so that the coil support may freely rotate with respect to the brake pad. A spring is secured to the shaft to yieldably urge the shaft in such a manner so that the coil support will move into frictional engagement with the brake pad.

A principal object of the invention is to provide an extremely simple but yet efficient welding wire dispenser.

A further object of the invention is to provide a welding wire dispenser which relies upon the weight of the wire and a spring to aid in halting the rotation of the coil.

A further object of the invention is to provide a welding wire dispenser which can accommodate various types of reels or coils.

Still another object of the invention is to provide a welding wire dispenser which prevents any twisting of the welding wire.

Still another object of the invention is to provide a welding wire dispenser which dispenses welding wire in a smooth manner so as not to interfere with the welding operation.

Yet another object of the invention is to provide a welding wire dispenser which is economical to manufacture and durable in use.

These and other objects will be apparent to those skilled in the art.

DESCRIPTION OF THE PREFERRED EMBODIMENT

Figure 1:
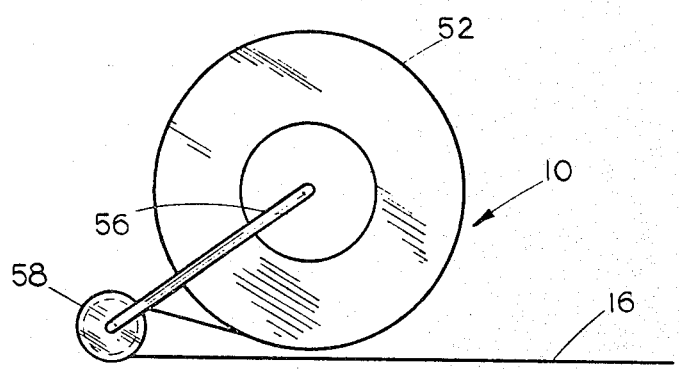
FIG. 1 is a top elevational view of the wire dispenser of this invention.

The wire dispenser of this invention is referred to generally by the reference numeral 10 while the reference numeral 12 refers to a conventional wire feeder adapted to supply welding wire to welder 14.

Dispenser 10 includes a floor-engaging support means 18 having a hub means 20 at its upper end as seen in the drawings. Hub means 20 is provided with an annular brake pad 22 at its upper end and has a pair of bearings 24 and 26 mounted therein adapted to rotatably support shaft 28. A helical cam surface 30 is positioned above bearing 26 and is adapted to support the cam follower 32 secured to shaft 28. Spring 34 embraces shaft 28 and has one end thereof in engagement with pin 36 and its other end embracing post 38. Spring 34 normally urges shaft 28 in such a direction to cause the cam follower 32 to move to the lower end of the cam 30.

The numeral 40 refers to a coil support which is rotatably mounted on the shaft 28 above hub 20 by means of bearing 42 and 44. As seen in the drawings, coil support 40 is vertically movable with shaft 28. Coil support 40 includes a plurality of radially extending arms 46 adapted to support the coil or reel 48 thereon. Upstanding members 50 are provided on the supports 46 to aid in the positioning of the reel 48 on the support 40. The coil 48 is maintained on the support 40 by any convenient means such as by some sort of cover 52 clamped onto the upper surface of the reel or coil.

As seen in the drawings, shaft 28 includes a pair of laterally extending pins 54 adjacent the upper end thereof. The lower end of arm 56 embraces the upper end of shaft 26 and has a pair of cut-out portions or notches 58 adapted to receive the pins 54 so that the lower end of arm 56 will rotate with shaft 28 and vice versa. Arm 56 extends upwardly through the center of the reel and extends laterally outwardly therefrom. As seen in the drawings, the outer end of arm 56 is provided with a pulley 58 rotatably mounted thereon adapted to have the wire 16 extending therearound.

Figure 2:
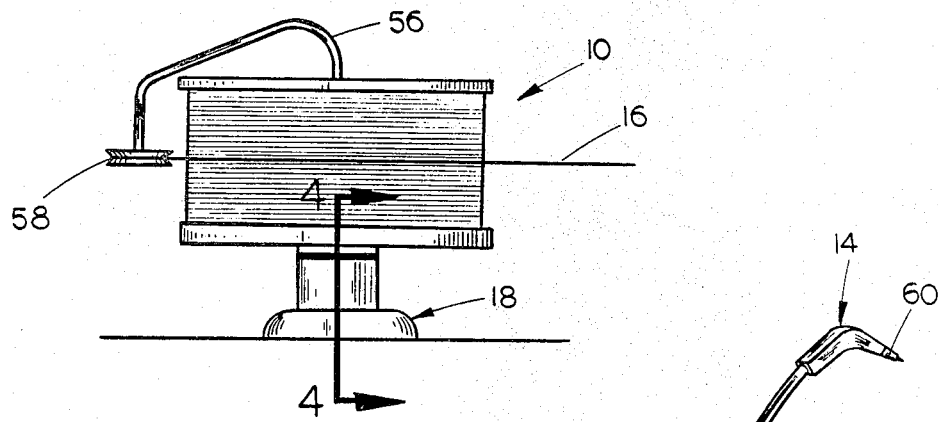
FIG. 2 is a side view of the dispenser of this invention.
Figure 3:
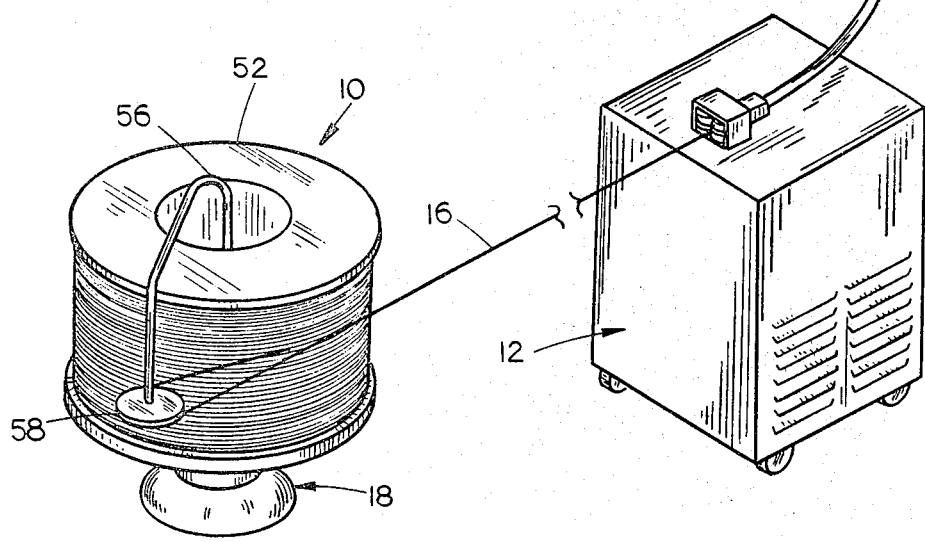
FIG. 3 is a perspective view of the wire dispenser of this invention illustrating its relationship with a wire feeder.
Figure 4:
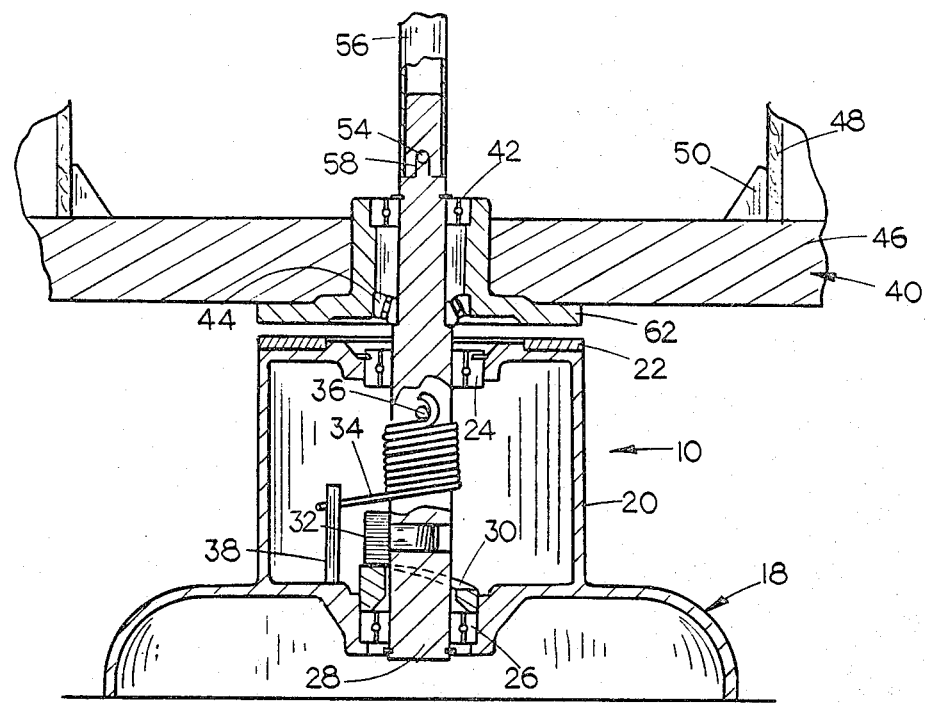
FIG. 4 is an enlarged sectional view seen on lines 4-4 of FIG. 2 illustrating the coil support out of braking engagement with the brake pad.
Figure 5:
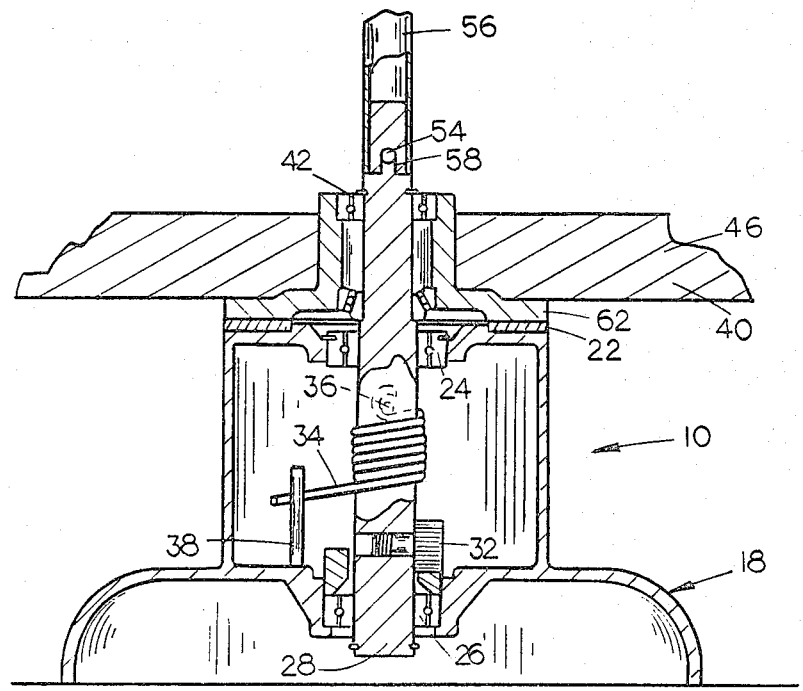
FIG. 5 is a view similar to FIG. 4 except that the coil support has been lowered into engagement with the brake pad.

In operation, the arm 56 would initially be removed from the shaft 28 and the cover 52 removed with the reel 48 being placed on the members 46. The cover 52 is then replaced. The straps maintaining the wire on the reel in position would be removed and the wire 16 extended around the pulley 58 as illustrated in FIGS. 1-3. The wire 16 is then fed through the wire feeder and extended through the tip 60 on the welder 14. The coil support 46 is normally in the position illustrated in FIG. 5 with the annular portion 62 of support 40 being in frictional engagement with the brake-lining material 22 which prevents rotation of the support means 40 relative to the hub 20. As the wire feeder 12 pulls wire from the coil, the arm 56 will be pivotally moved towards the wire feeder 12 which will cause the shaft 28 to be rotated. The rotation of the shaft 28 causes the roller of the follower 32 to roll upwardly upon the helical cam 30 thereby causing shaft 28 to be moved upwardly relative to hub 20. Upward vertical movement of the shaft 28 causes the annular portion 62 of the support 40 to be moved out of frictional engagement with the brake-lining material 22 thereby permitting support 40 and the coil 48 to rotate so that wire can be dispensed therefrom. When the wire feeder 12 stops pulling wire, the weight of the coil 48 and the resiliency of the spring 34 causes the roller on the cam follower 32 to roll downwardly on the cam 30 to return the arm 56 to the starting position. This particular feature allows the full weight of the wire coil to apply the brake to the rotation of the coil and to stop the rotation of the coil. The braking action is enhanced by the spring 34 as previously described. Thus, when the coil is substantially full, a large amount of force will be needed to brake the coil but the weight of the coil will apply that force. Conversely, when the remaining amount of wire on the coil is low, very little braking force will be needed to halt the rotation of the coil.

The wire dispenser of this invention dispenses the welding wire to the wire feeder in a smooth fashion so that the welding operation will be smooth. Thus it can be seen that the wire dispenser of this invention accomplishes at least all of its stated objectives.

I claim:

1. A welding wire dispenser for dispensing wire to a wire feeder, a support means including a hub means thereon, said hub means having a horizontally disposed annular portion at its upper end, a vertically disposed and vertically movable shaft rotatably mounted in said support means and extending upwardly therefrom through said hub means, a coil support means rotatably mounted on the upper end of said shaft above said hub means and vertically movable with said shaft, said coil support means having a horizontally disposed annular portion at its lower end adapted to frictionally engage said annular portion on said hub means to limit the rotation of said coil support means when said annular portions are in frictional engagement with each other, said coil support means adapted to support a coil of welding wire thereon, an arm means removably secured to the upper end of said shaft and having an outer end portion disposed laterally of the coil of wire on the coil support means, a pulley rotatably mounted about a vertical axis on the outer end portion of the arm means adapted to have the welding wire on the coil extending therearound, a helical cam means in said hub extending around at least a portion of said shaft, a cam follower mounted on said shaft in engagement with said cam means whereby said cam follower will travel upwardly on said cam means thereby vertically moving said shaft so that said annular portions will not be in frictional engagement with each other so that said coil support means may freely rotate when said arm means is moved towards the wire feeder, and a spring means in operative engagement with said shaft which yieldably resists the rotation of said shaft as said cam follower travels upwardly on said cam means.

* * * * *